US011288673B1

(12) United States Patent
Venturelli et al.

(10) Patent No.: US 11,288,673 B1
(45) Date of Patent: Mar. 29, 2022

(54) ONLINE FRAUD DETECTION USING MACHINE LEARNING MODELS

(71) Applicant: Intuit Inc., Mountain View, CA (US)

(72) Inventors: Henry Venturelli, Los Angeles, CA (US); Natalie De Shetler, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 122 days.

(21) Appl. No.: 16/525,208

(22) Filed: Jul. 29, 2019

(51) Int. Cl.
| | |
|---|---|
| *G06N 20/00* | (2019.01) |
| *G06Q 20/40* | (2012.01) |
| *G06K 9/62* | (2022.01) |
| *H04L 29/06* | (2006.01) |
| *G06Q 30/00* | (2012.01) |

(52) U.S. Cl.
CPC ....... *G06Q 20/4016* (2013.01); *G06K 9/6256* (2013.01); *G06K 9/6267* (2013.01); *G06N 20/00* (2019.01); *G06Q 30/016* (2013.01); *H04L 63/102* (2013.01)

(58) Field of Classification Search
CPC .. G06Q 20/4016; G06Q 30/016; G06N 20/00; G06K 9/6256; G06K 9/6267; H04L 63/102
USPC .......................................................... 705/38
See application file for complete search history.

(56) References Cited

U.S. PATENT DOCUMENTS

| | | | | |
|---|---|---|---|---|
| 10,832,248 | B1 * | 11/2020 | Kramme | G06N 5/046 |
| 2004/0039548 | A1 * | 2/2004 | Selby | G06Q 40/02 |
| | | | | 702/179 |
| 2015/0142595 | A1 * | 5/2015 | Acuna-Rohter | G06Q 30/06 |
| | | | | 705/21 |
| 2016/0132886 | A1 * | 5/2016 | Burke | G06Q 20/3224 |
| | | | | 705/44 |
| 2017/0316450 | A1 * | 11/2017 | Kobylkin | G06Q 10/067 |
| 2018/0159871 | A1 * | 6/2018 | Komashinskiy | G06N 20/00 |
| 2019/0122149 | A1 * | 4/2019 | Caldera | G06Q 10/0635 |
| 2019/0147505 | A1 * | 5/2019 | Blass | G06Q 20/102 |
| | | | | 705/36 R |

OTHER PUBLICATIONS

Stokes, J. W., et al., "ALADIN: Active Learning of Anomalies to Detect Intrusion", Mar. 4, 2008, 24 pages.
Liu, F. T., et al., "Isolation Forest", Jan. 1, 2009, 10 pages.
(Continued)

*Primary Examiner* — Lindsay M Maguire
*Assistant Examiner* — Michael J Warden
(74) *Attorney, Agent, or Firm* — Ferguson Braswell Fraser Kubasta PC

(57) ABSTRACT

A method is disclosed. The method includes obtaining an access request associated with a user for a software application; obtaining a plurality of verification attributes associated with the user; generating a fraud score for the access request by feeding a supervised machine learning (ML) classifier with a feature vector for the user that is based on the plurality of verification attributes; selecting a first unsupervised ML anomaly detector of a plurality of unsupervised ML anomaly detectors based on the fraud score; generating an anomaly score for the access request by feeding the first unsupervised ML anomaly detector with an augmented feature vector for the user that is based on the plurality of verification attributes and the fraud score; and processing the access request based on the anomaly score.

20 Claims, 6 Drawing Sheets

(56) References Cited

OTHER PUBLICATIONS

"sklearn.preprocessing.MinMaxScaler", https://scikit-learn.org/stable/modules/generated/sklearn.preprocessing.MinMaxScaler.html, Jan. 1, 2007, 1 page.

Comar, P. M., et al., "Combining Supervised and Unsupervised Learning for Zero-Day Malware Detection", 2013 Proceedings IEEE INFOCOM, Apr. 14-19, 2013, 9 pages.

Alazab, M., et al, "Zero-Day Malware Detection Based on Supervised Learning Algorithms of API call Signature", Proceedings of the 9th Australasian Data Mining Confere (AusDM'11), Dec. 1, 2011, 12 pages.

\* cited by examiner

FIG. 1  System 100

ONLINE FRAUD DETECTION USING MACHINE LEARNING MODELS

BACKGROUND

Estimating the likelihood of fraud is important in many online scenarios. However, any technique for determining fraud is likely to have false positives and/or false negatives. In other words, there is a possibility that the fraud determination technique will identify fraud in cases where there is actually no fraud. There is also a possibility that the fraud determination technique will not identify fraud in cases where there actually is fraud. A fraud determination technique that identifies possible false positives and/or false negatives before deciding that fraud is or is not likely would be beneficial.

SUMMARY

In general, in one aspect, one or more embodiments relate to a method. The method comprises: obtaining an access request associated with a user for a software application; obtaining a plurality of verification attributes associated with the user; generating a fraud score for the access request by feeding a supervised machine learning (ML) classifier with a feature vector for the user that is based on the plurality of verification attributes; selecting a first unsupervised ML anomaly detector of a plurality of unsupervised ML anomaly detectors based on the fraud score; generating an anomaly score for the access request by feeding the first unsupervised ML anomaly detector with an augmented feature vector for the user that is based on the plurality of verification attributes and the fraud score; and processing the access request based on the anomaly score.

In general, in one aspect, one or more embodiments relate to a system. The system, comprising: a repository storing a plurality of verification attributes associated with a user; a feature vector engine configured to generate a feature vector and an augmented feature vector based on the plurality of verification attributes in response to an access request for a software application; a supervised machine learning (ML) classifier configured to generate a fraud score for the access request based on the feature vector; a first unsupervised ML anomaly detector associated with a first fraud score range and configured to generate an anomaly score for the access request based on the augmented feature vector; a second unsupervised ML anomaly detector associated with a second fraud score range, wherein the augmented feature vector comprises the fraud score, and wherein the first unsupervised ML anomaly detector is selected to generate the anomaly score in response to the fraud score falling within the first fraud score range but not the second fraud score range; and a request review engine configured to process the access request based on the anomaly score.

In general, in one aspect, one or more embodiments relate to a non-transitory computer readable medium (CRM) storing instructions. The instructions, when executed by a computer processor, cause the computer processor to: obtain an access request associated with a user for a software application; obtain a plurality of verification attributes associated with the user; generate a fraud score for the access request by feeding a supervised machine learning (ML) classifier with a feature vector for the user that is based on the plurality of verification attributes; select a first unsupervised ML anomaly detector of a plurality of unsupervised ML anomaly detectors based on the fraud score; generate an anomaly score for the access request by feeding the first unsupervised ML anomaly detector with an augmented feature vector for the user that is based on the plurality of verification attributes and the fraud score; and process the access request based on the anomaly score.

Other aspects of the embodiments will be apparent from the following description and the appended claims.

DETAILED DESCRIPTION

In the following detailed description of embodiments, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may succeed (or precede) the second element in an ordering of elements.

One or more embodiments of the invention are directed towards utilizing multiple machine learning (ML) models (e.g., a supervised ML classifier, an unsupervised ML anomaly detector) to detect fraud associated with an access request (i.e., a user request to access/utilize a software application). The supervised ML classifier determines a fraud score for each access request based on verification attributes associated with the user (i.e., individual, business entity, merchant, etc.). The fraud scores are used to cluster the access requests. An unsupervised ML anomaly detector exists for each cluster. An unsupervised ML anomaly detector generates an anomaly score for each access request in the corresponding cluster. The combination of the fraud score and anomaly score from the multiple ML models may be used to identify possible false-positives and false-negatives in the fraud detection. This is a technical improvement(s) to at least the technical fields of ML fraud detection, user authentication/verification, and software access control.

Figure 1:
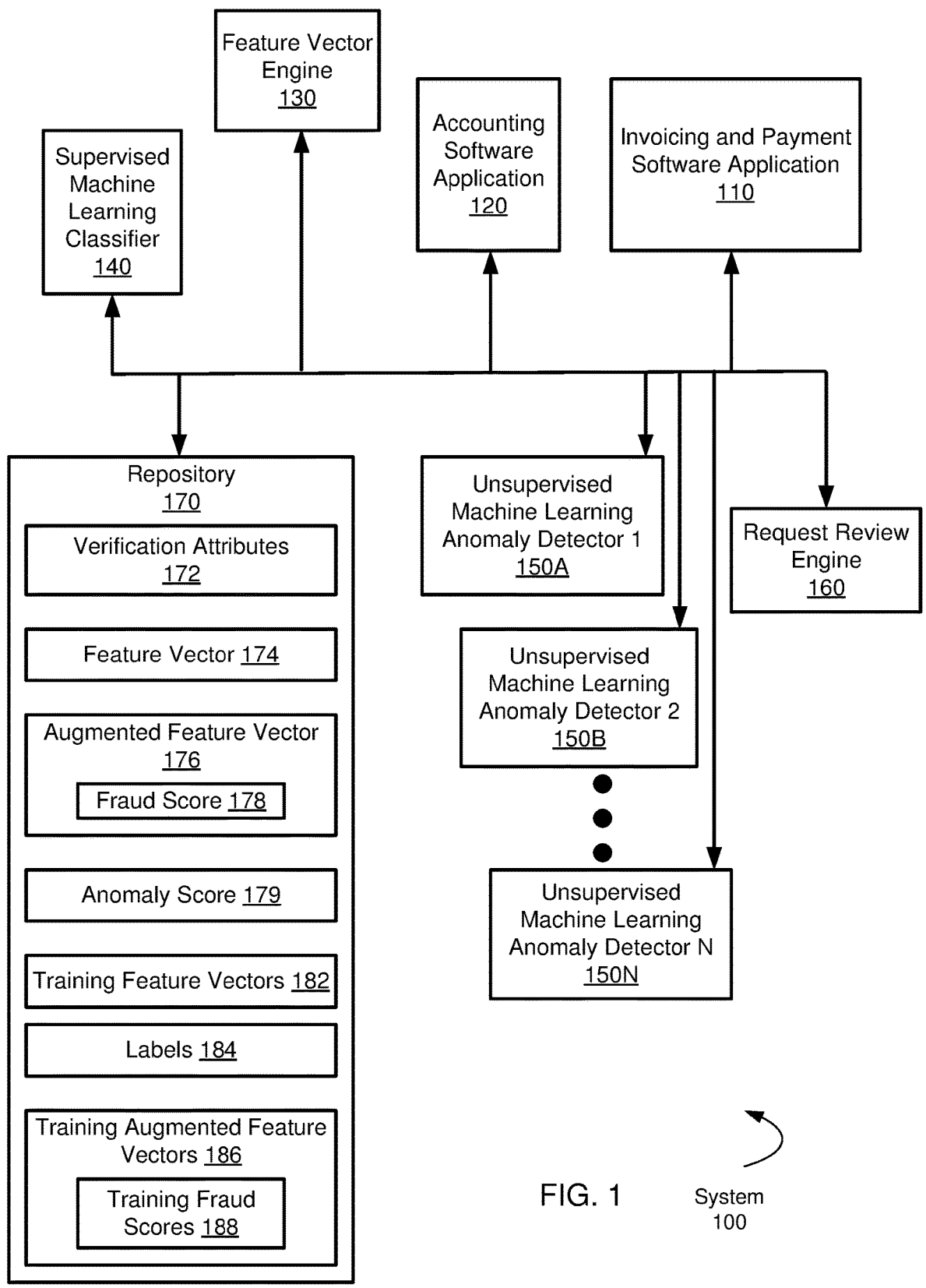
FIG. 1 shows a system in accordance with one or more embodiments of the invention.

FIG. 1 shows a system (100) in accordance with one or more embodiments of the invention. As shown in FIG. 1, the system (100) has multiple components including a software application, such as an invoicing and payment software application (110), an accounting software application (120), a feature vector engine (130), a supervised ML classifier (140), multiple unsupervised ML anomaly detectors (i.e., unsupervised ML anomaly detector 1 (150A), unsupervised ML anomaly detector 2 (150B), unsupervised ML anomaly detector N (150N)), a request review engine (160), and a repository (170). These components (110, 120, 130, 140, 150A-150N, 160, 170) may execute on the same computing device (e.g., server, personal computer (PC), tablet PC, smart phone, mainframe, etc.) or on different computing devices connected by one or more networks having wired and/or wireless segments.

In one or more embodiments of the invention, the accounting software application (120) is utilized by a user (i.e., individual, business entity, merchant, etc.) to track income, assets, expenses, accounts receivable, etc. The accounting software application (120) may maintain a profile on each user including how long the user has been a customer of the accounting software application, how frequently the user accesses the accounting software application, average monthly income of the user, average monthly expenses of the user, social security number of the user, address of a user, phone number of the user, etc.

In one or more embodiments of the invention, the invoicing and payment software application (110) enables users to send/receive invoices and send/receive payments associated with the invoices. For example, the invoicing and payment software application (110) may enable a user (e.g., merchant) to send (e.g., by email) an electronic invoice with a "Pay Now" button to a customer. As another example, the invoicing and payment software application (110) may enable the customer to pay the invoice using a credit card, a debit card, ACH bank transfer, etc. The invoicing and payment software application (110) may be a standalone software application (as shown in FIG. 1) or may be a component/service within the accounting software application (120). Invoices and payments sent/received using the invoicing and payment software application (110) may trigger automatic and seamless updates to the records in the accounting software application (120). A user request to access the invoicing and payment software application (110) may be initiated from within the accounting software application (120) (or from another software application (not shown)).

Those skilled in the art, having the benefit of this detailed description, will appreciate that the provider/owner of the invoicing and payment software application (110) takes on one or more risks of fraud by facilitating payments between the customer and the user (e.g., merchant). For example, a malicious user (e.g., merchant) might not deliver a service or product to the customer even if the customer has already paid for the product or service by credit card. In such a scenario, the customer may initiate a chargeback and the provider/owner of the invoicing and payment software application (110) may be responsible for reimbursing the customer. As yet another example, a malicious customer may use a stolen credit card to pay for the user's (e.g., merchant) product or service. In such a scenario, the actual owner of the stolen credit card may initiate a chargeback and the provider/owner of the invoicing and payment software application (110) may be responsible for reimbursing the actual owner. In one or more embodiments, due to the risk of fraud, the provider/owner may evaluate user requests to access the invoicing and payment software application (110) for fraud.

In one or more embodiments of the invention, the feature vector engine (130) is configured to generate the feature vector (174) and the augmented feature vector (176) for a user access request. Both the feature vector (174) and the augmented feature vector (176) may be generated based on verification attributes (172) associated with the user. In general, each of the verification attributes (172) can be used to evaluate, at least partially, the likelihood of fraud associated with the user (and thus the access request). The verification attributes (172) may include user information from the user's profile in the accounting software application (120), information typed by the user while initiating the access request, information about the user's email address, information about the user's identity, information about the device being used to initiate the access request, credit history/reports/scores of the user, etc.

The verification attributes (172) may be in the format of strings, numerical values, and binary values. There are many (e.g., hundreds, thousands, etc.) examples of verification attributes (172) and many sources of verification attributes (172) including the user profile in the accounting software application (120) and third-party sources (e.g., third-party vendors) (not shown). Some elements (i.e., features) of the feature vector (174) and/or the augmented feature vector (176) may be extracted directly from the verification attributes (172). Some elements (i.e., features) of the feature vector (174) and/or the augmented feature vector (176) may be encodings (e.g., ranked label encoding, one hot encoding, etc.) of verification attributes (172). Some elements (i.e., features) of the feature vector (174) and/or the augmented feature vector (176) may be calculated based on the verification attributes (172).

For example, the verification attributes (172) may include the zip code of the user, the phone number of the user, and the IP address of the device being used by the user to initiate the access request, the geo distance of the user's IP address from the user's residence and place of business, whether the user is using a virtual private network (VPN), if the user is shielding his/her true IP address and the location of the true (i.e., pierced) IP address, the merchant categorization code (MCC) of the user, the software application where the access request was initiated (e.g., accounting software application (120) or elsewhere). The feature vector (174) and the augmented feature vector (176) may include, as an element, the distance between the region (e.g., city, county, state, country, etc.) determined from the IP address and the zip code. Additionally or alternatively, the feature vector (174) and the augmented feature vector (176) may include, as an element, the distance between the region (e.g., city, county, state, country, etc.) determined from the IP address and the region associated the area code. As another example, the verification attributes (172) may include the age of the email address provided by the user (e.g., in the profile of the user in the accounting software application (120)), and the feature vector (174) and the augmented feature vector (176) may also include the age of the email. As yet another example, the verification attributes (172) may include the frequency that the user accesses the accounting software application (120) and how long the user has had an account with the accounting software application (120), while the feature vector (174) and the augmented feature vector (176) may also include the frequency that the user accesses the accounting software application (120) and how long the user has had an account with the accounting software application (120).

As additional examples, the verification attributes (172) may include an indication as to whether the user's email, phone number, address, IP address, social security number, etc. has been associated with fraud in the past. The verification attributes (172) may include the number of addresses linked to the user's phone number or social security number in the last K years (e.g., K=3), the number of birthdays associated with the user's social security number, etc. The verification attributes (172) may include an indication of whether the user's name, social security number, birthday, address, etc. has been confirmed by a third-party vendor. The verification attributes (172) may include data about credit tradelines of the user (e.g., number of loans, lender/bank names, loan amounts, number of credit inquiries, number of delinquent accounts, age of loans, etc.). Further still, the verification attributes (172) may include the number of access requests for other software applications initiated by the user within some time window.

In one or more embodiments of the invention, the supervised ML classifier (140) is configured to generate a fraud score (178) for the access request based on the feature vector (174) associated with the access request. In other words, the feature vector (174) is the input to the supervised ML classifier (140), while an output of the supervised ML classifier (140) is the fraud score (178). The fraud score is the likelihood of the access request being associated with a malicious user. The fraud score (178) may take on values between "0" and "1", inclusive, with "1" indicating the highest probability of fraud. The supervised ML classifier (140) may be implemented using gradient boosted decision trees (e.g., XGBoost), k-nearest neighbor, neural networks, any binary classification method, etc. The supervised ML classifier (140) may be initially trained using training feature vectors (182) and labels (184) corresponding to historic user access requests and their known binary outcomes (i.e., fraud, no fraud), respectively.

As discussed above, the system (100) includes multiple unsupervised ML anomaly detectors (150A-150N). For example, there may be 10 unsupervised ML anomaly detectors (150A-150N). Each of the unsupervised ML anomaly detectors (150A-150N) is configured to generate an anomaly score based on an augmented feature vector. In other words, each of the unsupervised ML anomaly detectors (150A-150N) inputs augmented feature vectors associated with user access requests and outputs anomaly scores for the user access requests.

In one or more embodiments of the invention, each unsupervised ML anomaly detector (150A-150N) is assigned a non-overlapping fraud score range. Together, all of the assigned fraud score ranges cover every possible fraud score that might be output by the supervised ML classifier (140). For example, unsupervised ML anomaly detector A (150A) may be assigned the fraud score range [0, 0.1], unsupervised ML anomaly detector B (150B) may be assigned the fraud score range (0.1, 0.2], unsupervised ML anomaly detector N (150N) may be assigned the fraud range (0.9, 1.0], etc. The multiple fraud score ranges might or might not be identical in size.

As shown in FIG. 1, the augmented feature vector (176) for a user access request includes the fraud score (178) for the user access request (as generated by the supervised ML classifier (140)). The augmented feature vector (176) will be consumed by (i.e., will be an input to) the unsupervised ML anomaly detector assigned the fraud score range including fraud score (178). For example, if the fraud score (178) is 0.15 and thus falls within the fraud score range (0.1, 0.2], the augmented feature vector (176) will be an input to unsupervised ML anomaly detector B (150B) (but not the remaining unsupervised ML anomaly detectors), and the anomaly score (179) will be an output of unsupervised ML anomaly detector B (150B).

By selecting unsupervised ML anomaly detectors (150A-150N) based on fraud scores, the augmented feature vectors (and thus the corresponding access requests) are effectively being segregated/clustered by fraud scores, and there is one unsupervised ML anomaly detector per cluster. The resulting anomaly score thus represents how similar (or how different) the access request is with historic access requests belonging to the same cluster. The unsupervised anomaly detectors (150A-150N) may be implemented using isolation forests or other outlier detection methods. In one or more embodiments of the invention, the anomaly score takes on values between −3.0 and 3.0, with values closer to −3.0 representing more anomalous user access requests among user access requests with similar fraud scores. Other anomalous score values are also possible. The unsupervised ML anomaly detectors (150A, 150B, 150N) may be initialized using training augmented feature vectors (186) and training fraud scores (188), discussed below.

In one or more embodiments of the invention, an anomaly score indicating an outlier access request may be an indication of a false positive or a false negative. For example, if an access request is initially assigned a high fraud score (indicating a high likelihood of fraud), but the access request is later deemed to be an anomaly compared to historic high fraud score access requests, the access request might not actually be associated with fraud (i.e., a false positive). Additionally or alternatively, the anomaly may indicate a new type of fraud. In contrast, if an access request is initially assigned a low fraud score (indicating a low likelihood of fraud), but the access request is later deemed to be an anomaly compared to historic low fraud score access requests, the access request might actually be associated with fraud (i.e., a false negative). Additionally or alternatively, the anomaly may indicate a new type of legitimate user for the invoicing and payment software application (110).

In one or more embodiments of the invention, the request review engine (160) is configured to flag (e.g., store) an access request for manual review (e.g., by a human risk agent), automatically approve an access request, and/or automatically deny an access request. Specifically, the request review engine (160) may determine to flag an access request, approve an access request, or deny an access request by comparing the fraud score and anomaly score of the access request with various thresholds. For example, if an access request has a low fraud score and a low anomaly score (i.e., the access request is unlikely to be associated with fraud and is not an anomaly), the access request may be granted. In such cases the user may be given immediate access to the functions of the invoicing and payment software application (110). If the access request has a high fraud score and a low anomaly score (i.e., the access request is likely to be associated with fraud and is not an anomaly), the access request may be denied. If the access request has a large anomaly score (i.e., the access request is an outlier) regardless of fraud score, the access request may be flagged for review by a human risk agent. This scenario represents possible false positives or false negatives, requiring additional review before an approval or denial can be issued.

In one or more embodiments of the invention, the repository (170) is any type of storage unit and/or device (e.g., a file system, database, collection of tables, or any other storage mechanism) for storing data. Further, the repository (170) may include multiple different storage units and/or devices. The multiple different storage units and/or devices might or might not be of the same type or located at the same physical site.

Although FIG. 1 explicitly shows an accounting software application (120) and an invoicing and payment software application (110), in other embodiments, both the accounting software application (120) and the invoicing and payment software application (110) may be replaced with other types of software.

Figure 2:
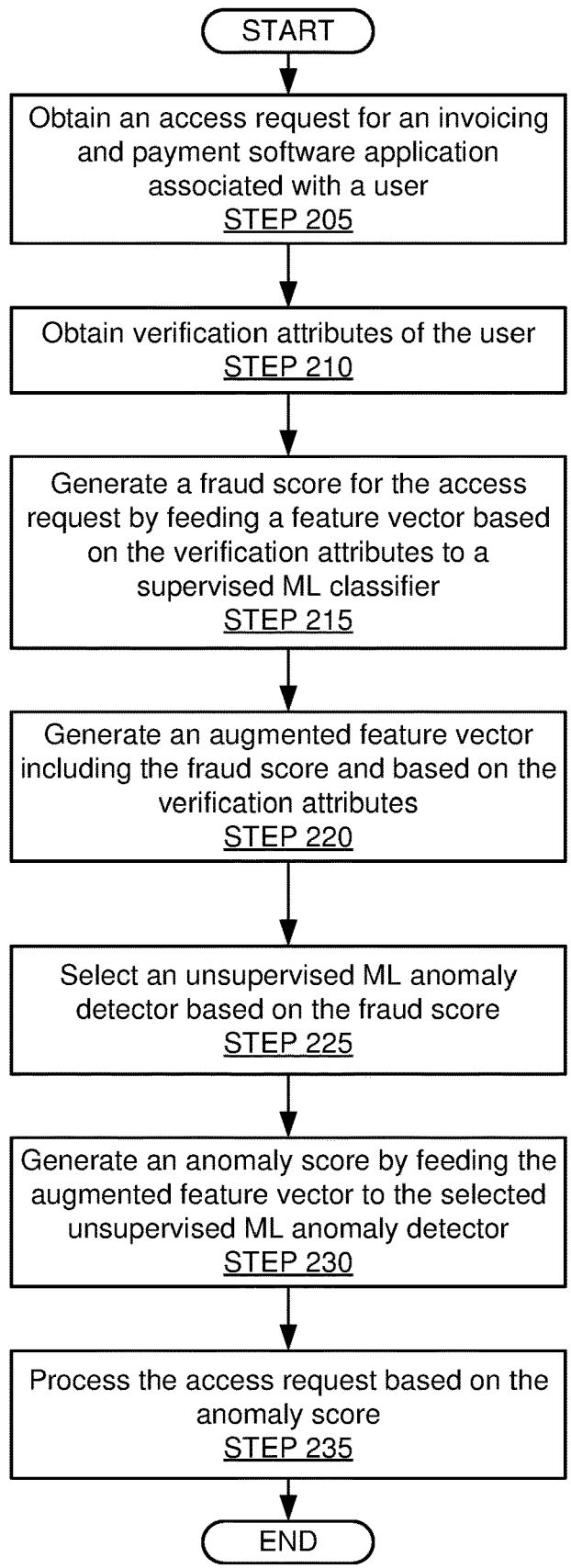
FIG. 2 shows a flowchart in accordance with one or more embodiments of the invention.

FIG. 2 shows a flowchart in accordance with one or more embodiments of the invention. The flowchart of FIG. 2 depicts a process for detecting fraud using multiple ML models. The process may be performed by one or more components of the system (100) (e.g., feature vector engine (130), supervised ML classifier (140), unsupervised ML anomaly detectors (150A-150N), request review engine (160)), discussed above in reference to FIG. 1. In one or more embodiments, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, an access request is obtained from a user (STEP 205). The access request may correspond to a request, by the user, to utilize the functionality of a software application, such as an invoicing and payment software application. The access request may be initiated from within an accounting software application where the user has a profile. Although STEP 205 explicitly discloses an invoicing and payment software application and an accounting software application, these software applications may be replaced with other types of software applications.

In STEP 210, verification attributes associated with the user are obtained. As discussed above, each of the verification attributes can be used to evaluate, at least partially, the likelihood of fraud associated with the user and thus the access request. The verification attributes may include user information from the user's profile in the accounting software application, information typed by the user while initiating the access request, information about the user's email address, information about the user's identity, information about the user's device being used to initiate the access request, credit history/reports/scores of the user, etc. The verification attributes may be in the format of strings, numerical values, and binary values. There are many (e.g., hundreds, thousands, etc.) examples of verification attributes and many sources of verification attributes including third-party sources (e.g., third-party vendors).

In STEP 215, a fraud score is generated for the access request. The fraud score is the likelihood of the access request being associated with a malicious user. The fraud score may be generated by a supervised ML classifier (e.g., XGBoost) in response to a feature vector that is based on the verification attributes. In other words, the feature vector is the input to the supervised ML classifier while the fraud score is an output of the supervised ML classifier. Some elements (i.e., features) of the feature vector may be extracted directly from the verification attributes. Some elements of the feature vector may be encodings (e.g., ranked label encoding, one hot encoding, etc.) of verification attributes. Some elements (i.e., features) of the feature vector may be calculated based on the verification attributes (172).

In STEP 220, an augmented feature vector is generated for the access request. The augmented feature vector is similar to the feature vector of STEP 215. The main difference is that the augmented feature vector also includes the fraud score for the access request (from the supervised ML classifier). Another difference is the possible encoding techniques utilized for categorial variables (i.e., strings). For example, the feature vector may utilize dummy encoding, while the augmented feature vector may use encoding techniques discussed below in reference to FIG. 3 and FIG. 4.

As discussed above, the system (100) includes multiple unsupervised ML anomaly detectors (e.g., isolation forests). Each unsupervised ML anomaly detector is assigned a non-overlapping fraud score range. The multiple fraud score ranges might or might not be identical in size. In STEP 225, one of the unsupervised ML anomaly detectors is selected. Specifically, the unsupervised ML anomaly detector assigned the fraud score range that includes the fraud score from STEP 215 is selected.

In STEP 230, an anomaly score is generated for the access request. The anomaly score may be generated by the selected unsupervised anomaly detector in response to the augmented feature vector of STEP 220. In other words, the augmented feature vector is the input to the unsupervised ML anomaly detector while the fraud score is an output of the unsupervised ML anomaly detector. The anomaly score represents how similar (or how different) the access request is with historic access requests having similar fraud scores.

In STEP 235, the access request is processed based on at least the anomaly score. Processing may include flagging/storing the access request for manual review (e.g., by a human risk agent), automatically approving the access request, and/or automatically denying the access request. The processing is based on comparisons between the fraud score and anomaly score of the access request with various thresholds. For example, if an access request has a low fraud score and a low anomaly score (i.e., the access request is unlikely to be associated with fraud and is not an anomaly), the access request may be granted. If the access request has a high fraud score and a low anomaly score (i.e., the access request is likely to be associated with fraud and is not an anomaly), the access request may be denied. If the access request has a large anomaly score (i.e., the access request is an outlier) regardless of fraud score, the access request may be flagged for review by a human risk agent. This last scenario represents possible false positives or false negatives, requiring additional review before an approval or denial can be issued.

Figure 3:
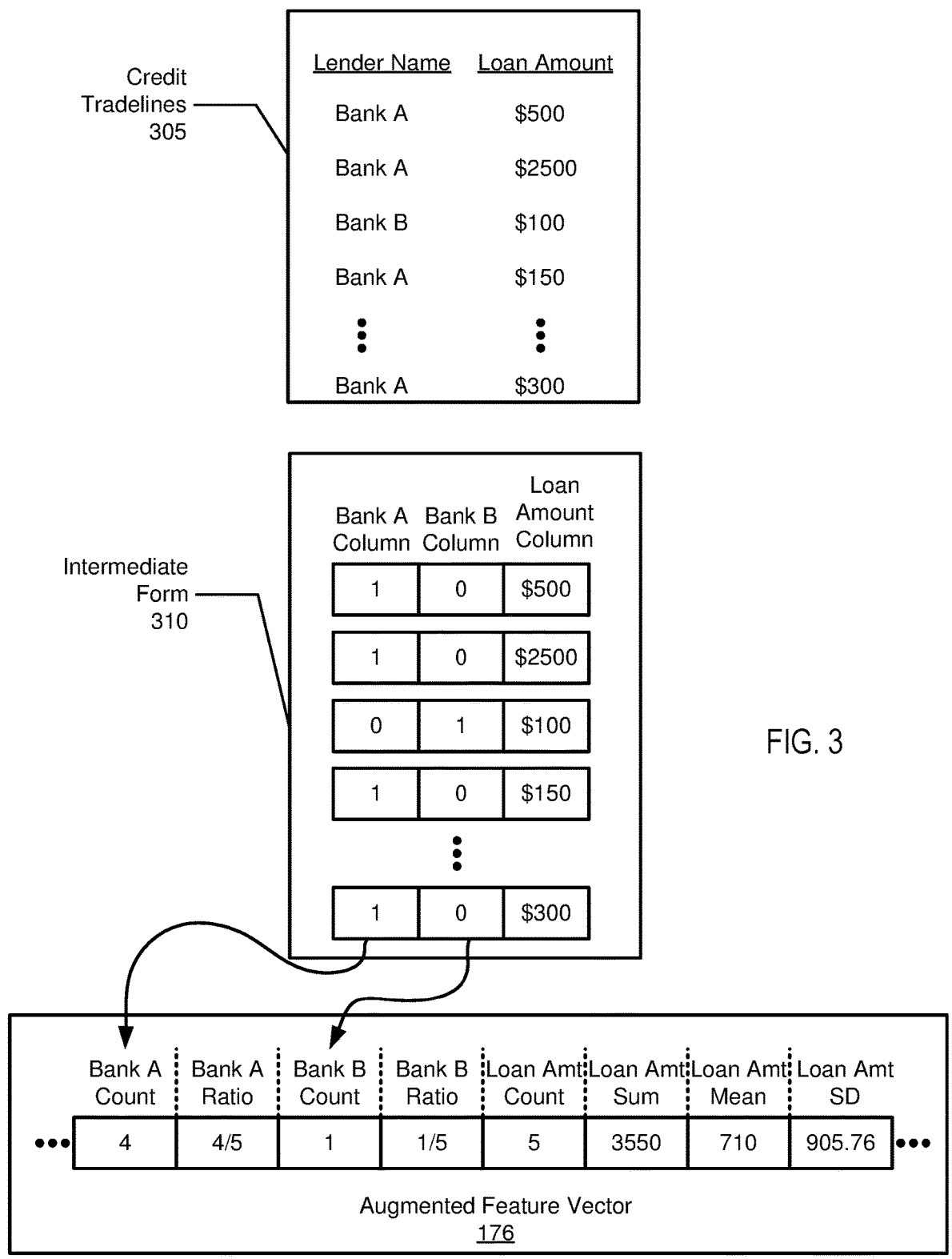
FIG. 3 and FIG. 4 show examples in accordance with one or more embodiments of the invention.

FIG. 3 shows an example in accordance with one or more embodiments. Specifically, FIG. 3 shows partial generation of the augmented feature vector (176). As shown in FIG. 3, there exists credit tradelines (305) for a user. The credit tradelines (305) may be examples of verification attributes (172) associated with the user and obtained from a third-party vendor (e.g., credit bureau). As shown in FIG. 3, the credit tradelines (305) include the lender name and the loan amount for each loan taken out by the user. Lender name is a common field to (i.e., shared by) all of the credit tradelines (305). Loan amount is also a common field to (i.e., shared by) all of the credit tradelines (305). Each row corresponds to a different loan.

In order to generate the augmented feature vector (176), the credit tradelines (305) must first be transformed into an intermediate form (310). In the intermediate form (310), the lenders' names have been one hot encoded. Specifically, one column for each possible lender name (e.g., Bank A, Bank B) has been generated. For each loan (each row), one and only one of these lender name columns is populated with a "1" while the remaining lender name columns are each populated with "0".

In order to generate the augmented feature vector (350), the number of 1s in a lender name column are counted. The count is repeated for the other lender name columns. Each of these counts occupy one element of the augmented feature vector (176). For example, as shown in the augmented feature vector (176), the Bank A column has a count of 4, while the Bank B column has a count of 1. Further, a ratio is calculated for each of the lender name columns. The ratio is the count of the lender name to the total number of loans (i.e., the total number of credit tradelines). Each of these ratios are also elements in the augmented feature vector (176). As shown in the augmented feature vector (176), the Bank A ratio is 4/5, while the Bank B ratio is 1/5. Although FIG. 3 focuses on lender name, this process may be repeated for other fields with categorical (i.e., string) variables.

As also shown in FIG. 3, multiple statistics are calculated based on the loan amounts. These statistics may include the number of loans (i.e., count of credit tradelines), the sum of the loan amounts, the mean loan amount, the standard deviation among the loan amounts, the minimum loan amount, the maximum loan amount, etc. One or more of these statistics occupy elements of the augmented feature vector (176). Although FIG. 3 focuses on loan amount, these statistical calculations may be repeated for other fields with numerical variables. The process shown in FIG. 3 may be executed by the feature vector engine (130).

Figure 4:
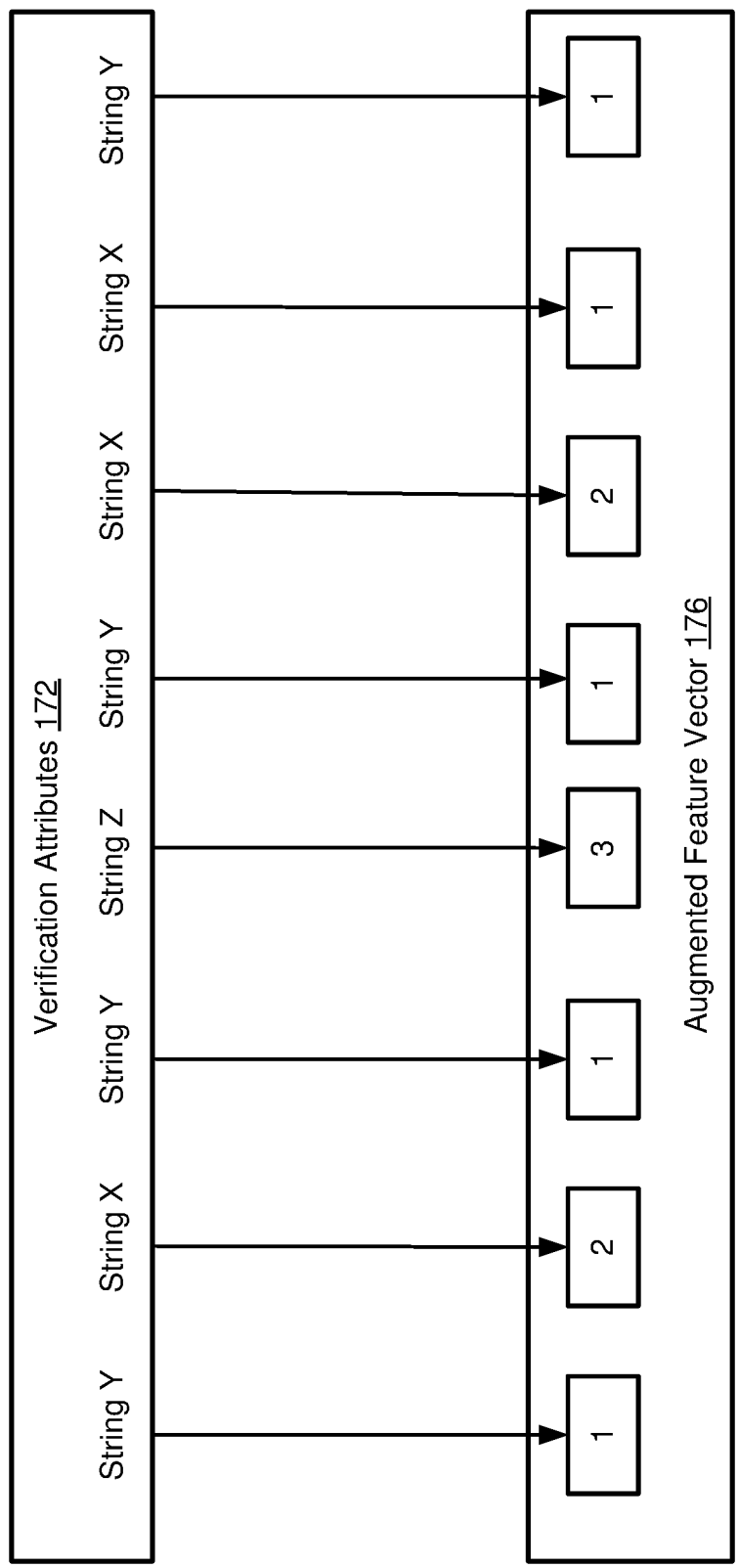

FIG. 4 shows an example in accordance with one or more embodiments. Specifically, FIG. 4 shows partial generation of the augmented feature vector (176). As shown in FIG. 4, verification attributes (172) associated with the user include multiple unique strings: string X, string Y, string Z. The string that occurs the most frequently (i.e., the string with the highest count as compared to other strings) (i.e., string Y) is assigned the highest rank of "1". The string that occurs the next most frequently (i.e., the string with the second highest count) (i.e., string X) is assigned the next highest rank of "2". Finally, the string the occurs the least frequently (i.e., the string with the lowest count) (i.e., string Z) is given the lowest rank of "3". As shown in FIG. 4, the elements in the augmented feature vector (176) include the rank of the string instead of the string itself. In other words, each string has been replaced with its rank in the augmented feature vector (176). Those skilled in the art, having the benefit of this detailed description, will appreciate this is an example of ranked label encoding. Moreover, this type of encoding may be utilized for any categorical (i.e., string) variables in the verification attributes (172). Example categorical variables that may be encoded as described in FIG. 4 include the identity of the source of the access request (i.e., the software application where the access request was initiated (e.g., accounting software application (120))) and the merchant categorization code (MCC) of the user. The process shown in FIG. 4 may be executed by the feature vector engine (130).

Figure 5:
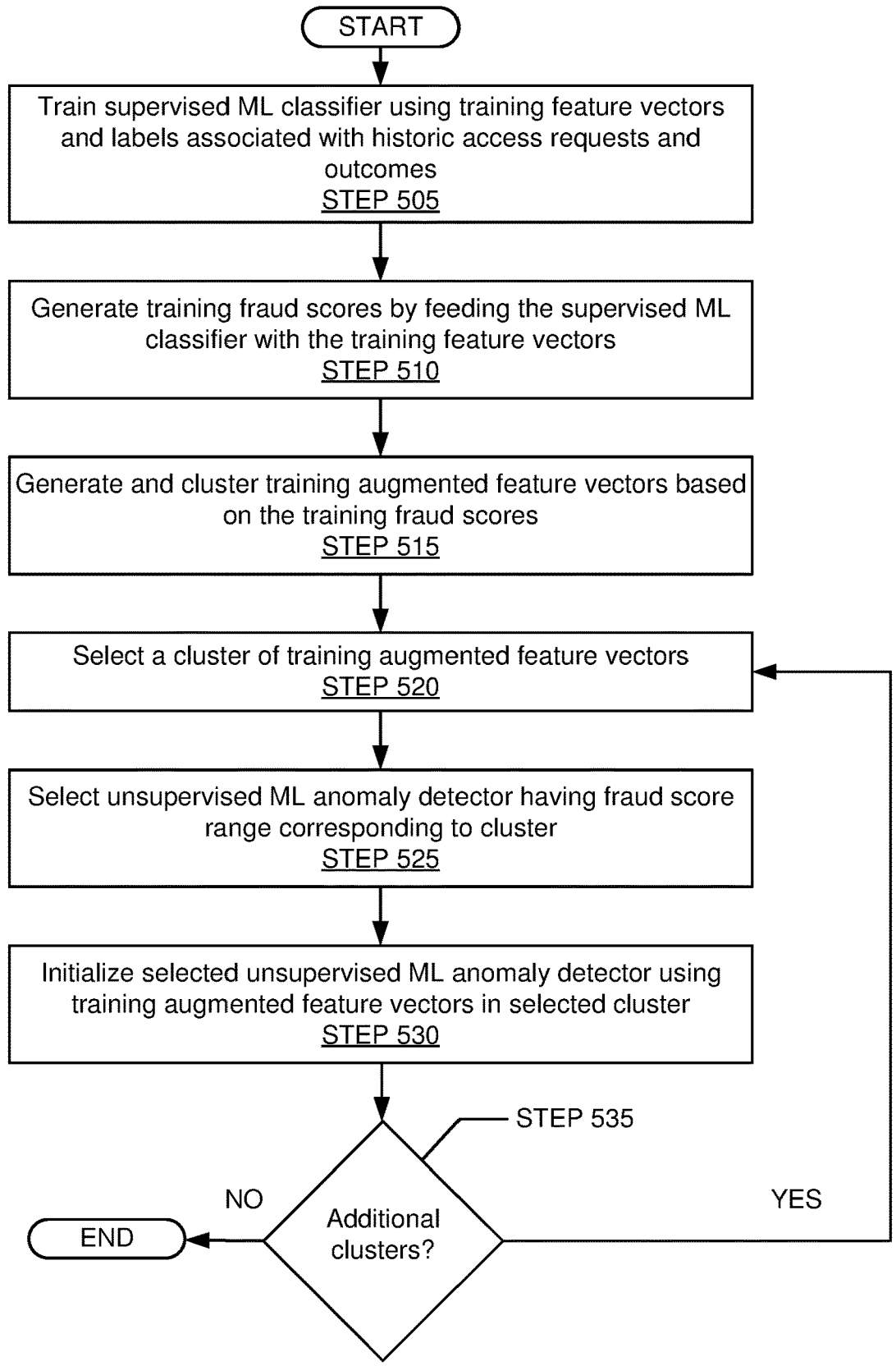
FIG. 5 shows a flowchart in accordance with one or more embodiments of the invention.

FIG. 5 shows a flowchart in accordance with one or more embodiments of the invention. The flowchart of FIG. 5 depicts a process for training/initializing the multiple ML models, discussed above in FIG. 1. In one or more embodiments, one or more of the steps shown in FIG. 5 may be omitted, repeated, and/or performed in a different order than the order shown in FIG. 5. Accordingly, the scope of the invention should not be considered limited to the specific arrangement of steps shown in FIG. 5. Moreover, one or more of the steps shown in FIG. 5 may be executed before the process of FIG. 2 is executed.

Initially, the supervised ML classifier is trained (STEP 505). The supervised ML classifier is trained using feature vectors that are based on historic access requests ("training feature vectors") and labels. The labels correspond to the known binary outcomes (i.e., fraud, no fraud) of the historic access requests. When training the supervised ML classifier, both the training feature vectors and the labels are inputs to the supervised ML classifier.

In STEP 510, multiple training fraud scores are generated. The multiple training fraud scores are generated by feeding the training feature vectors (but not the labels) to the supervised ML classifier. The output of the supervised ML classifier are training fraud scores corresponding to the training feature vectors (and thus also corresponding to the historic access requests).

In STEP 515, training augmented feature vectors are generated and clustered. The training augmented feature vectors are similar to the training feature vectors. The main difference is the training augmented feature vectors include the training fraud scores (from the supervised ML classifier).

As discussed above, the system (100) includes multiple unsupervised ML anomaly detectors (e.g., isolation forests). Each unsupervised ML anomaly detector is assigned a non-overlapping fraud score range. The multiple fraud score ranges might or might not be identical in size. Still referring to STEP 515, the training augmented feature vectors are clustered such that training augmented feature vectors having training fraud scores within the same fraud score range belong to the same cluster. Stated differently, the system groups together all training augmented feature vectors whose fraud score lies within a particular range with each other (i.e., dividing up the corpus of vectors into 10 groups, each group corresponding to a range of fraud scores).

In STEP 520, a cluster is selected. If this is the first execution of STEP 520, a cluster may be selected at random. Additionally or alternatively, the largest or smallest cluster may be selected. If this is not the first execution of STEP 520, a cluster may be selected at random from among the clusters that have not yet been selected. Additionally or alternatively, the largest or smallest cluster may be selected from among the clusters that have not yet been selected.

In STEP 525, the unsupervised ML anomaly detector having the fraud score range corresponding to the selected cluster (from STEP 520) is selected.

In STEP 530, the selected unsupervised ML anomaly detector is initialized by feeding the selected unsupervised ML anomaly detector with the training augmented feature vectors from the selected cluster.

In STEP 535, it is determined whether there exists at least one cluster that has not yet been selected. When it is determined that there has been at least one cluster that has not yet been selected the process returns to STEP 520. Otherwise, the process may end.

Figure 6A:
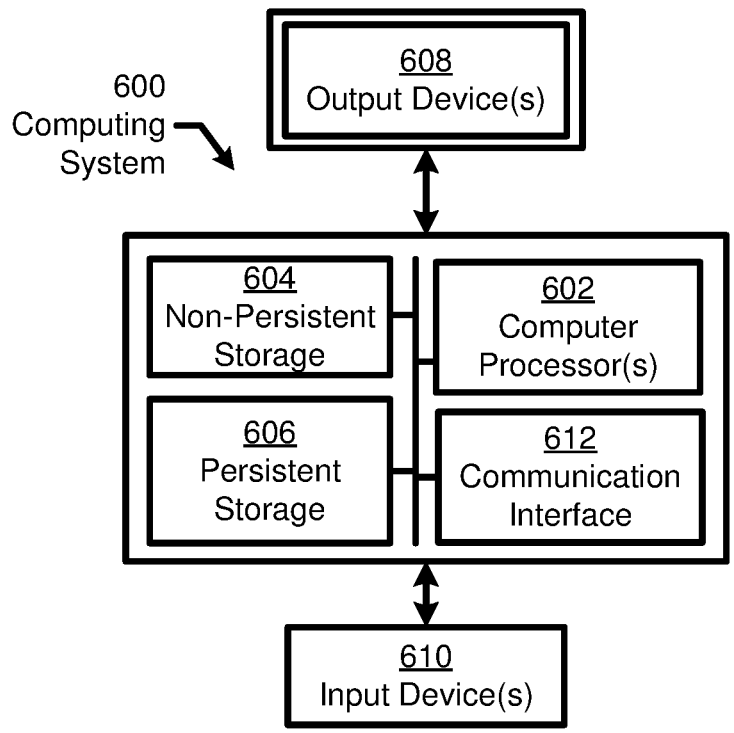
FIGS. 6A and 6B show a computer system in accordance with one or more embodiments of the invention.

Embodiments of the invention may be implemented on a computing system. Any combination of mobile, desktop, server, router, switch, embedded device, or other types of hardware may be used. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 6B:
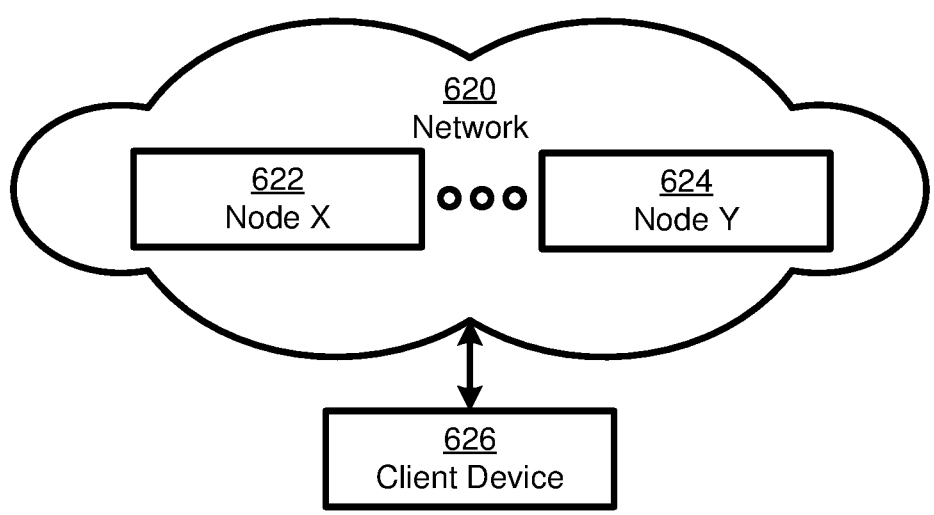

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments of the invention.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6A, while performing one or more embodiments of the invention, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6A and the nodes and/or client device in FIG. 6B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method, comprising:
    training a supervised machine learning (ML) classifier using training feature vectors corresponding to historic access requests and labels for binary outcomes for the historic access requests;
    generating, after training the supervised ML classifier, training fraud scores for the training feature vectors;
    generating clusters of training augmented feature vectors from the training feature vectors using the training fraud scores;
    initializing a plurality of unsupervised ML anomaly detectors using the clusters of training augmented feature vectors;
    obtaining an access request associated with a user for a software application;
    obtaining a plurality of verification attributes associated with the user;
    classifying, by the supervised ML classifier, the access request using a feature vector for the user that is based on the plurality of verification attributes to generate a fraud score;
    selecting a first unsupervised ML anomaly detector from the plurality of unsupervised ML anomaly detectors according to the fraud score falling within a unique range assigned to the first unsupervised ML anomaly detector;
    executing the first unsupervised ML anomaly detector using an augmented feature vector for the user that is based on the plurality of verification attributes and the fraud score to generate an anomaly score for the access request; and
    processing the access request based on the anomaly score.

2. The method of claim 1, wherein the access request is initiated from within an accounting software application utilized by the user.

3. The method of claim 1, wherein the supervised ML classifier is implemented using gradient boosted decision trees, and wherein each of the unsupervised ML anomaly detectors is implemented using an isolation forest.

4. The method of claim 1, wherein:
    the plurality of unsupervised ML anomaly detectors has a cardinality of 10, and
    each of the plurality of unsupervised ML anomaly detectors is assigned a unique fraud score range, the unique range being one of the unique fraud score ranges.

5. The method of claim 1, wherein processing the access request comprises storing the access request for manual review in response to the anomaly score satisfying a threshold.

6. The method of claim 1, wherein:
    the plurality of verification attributes comprises a user-specified location, an internet protocol (IP) address location associated with a device of the user, and an area code associated with a phone of the user; and
    the augmented feature vector comprises:
        a first distance between the user-specified location and the IP address location; and
        a second distance between the user-specified location and a region associated with the area code.

7. The method of claim 1, wherein:
    the plurality of verification attributes comprises an email address associated with the user; and
    the augmented feature vector comprises an age of the email address.

8. The method of claim 1, wherein:
    the plurality of verification attributes comprises a plurality numerical values and a plurality of strings associated with a plurality of credit tradelines of the user;
    each of the plurality of numerical values corresponds to a first field shared by the plurality of credit tradelines;
    each of the plurality of strings corresponds to a second field shared by the plurality of credit tradelines; and
    the augmented feature vector comprises:
        a count of the plurality of credit tradelines;
        a sum of the plurality of numerical values;
        a standard deviation of the plurality of numerical values;
        a count of a first string within the plurality of strings;
        a ratio of the count of the first string to the count of the plurality of credit tradelines;
        a count of a second credit string within the plurality of credit strings; and
        a ratio of the count of the second string to the count of the plurality of credit tradelines.

9. The method of claim 1, further comprising:
    identifying a plurality of unique strings within the plurality of verification attributes;
    determining a plurality of counts for the plurality of unique strings; and assigning a rank to each of the plurality of unique strings based on the plurality of counts,
wherein the augmented feature vector comprises the rank of each of the plurality of unique strings instead of the plurality of unique strings.

10. The method of claim 1, further comprising:
assigning a first fraud score range to the first unsupervised ML anomaly detector; and
assigning a second fraud range to a second unsupervised ML anomaly detector.

11. A system, comprising:
a repository storing a plurality of verification attributes associated with a user;
a feature vector engine configured to generate a feature vector and an augmented feature vector based on the plurality of verification attributes in response to an access request for a software application;
a supervised machine learning (ML) classifier configured to generate a fraud score for the access request based on the feature vector, wherein the supervised ML classifier is trained using training feature vectors corresponding to historic access requests and labels for binary outcomes for the historic access requests;
a first unsupervised ML anomaly detector, of a plurality of unsupervised ML anomaly detectors, assigned to a first unique fraud score range and configured to generate an anomaly score for the access request based on the augmented feature vector, wherein the plurality of unsupervised ML anomaly detectors are initialized by:
generating, after training the supervised ML classifier, training fraud scores for the training feature vectors,
generating clusters of training augmented feature vectors from the training feature vectors using the training fraud scores, and
initializing the plurality of unsupervised ML anomaly detectors using the clusters of training augmented feature vectors;
a second unsupervised ML anomaly detector associated with a second unique fraud score range,
wherein the augmented feature vector comprises the fraud score, and
wherein the first unsupervised ML anomaly detector is selected to generate the anomaly score in response to the fraud score falling within the first unique fraud score range and not the second unique fraud score range; and
a request review engine configured to process the access request based on the anomaly score.

12. The system of claim 11, wherein:
the access request is initiated from within an accounting software application utilized by the user;
the supervised ML classifier is implemented using gradient boosted decision trees; and
the first unsupervised ML anomaly detector is implemented using an isolation forest.

13. The system of claim 11, wherein:
the plurality of verification attributes comprises a user-specified location, an internet protocol (IP) address location associated with a device of the user, and an area code associated with a phone of the user; and
the augmented feature vector comprises:
a first distance between the user-specified location and the IP address location; and
a second distance between the user-specified location and a region associated with the area code.

14. The system of claim 11, wherein:
the plurality of verification attributes comprises a plurality numerical values and a plurality of strings associated with a plurality of credit tradelines of the user;
each of the plurality of numerical values corresponds to a first field shared by the plurality of credit tradelines;
each of the plurality of strings corresponds to a second field shared by the plurality of credit tradelines; and
the augmented feature vector comprises:
a count of the plurality of credit tradelines;
a sum of the plurality of numerical values;
a standard deviation of the plurality of numerical values;
a count of a first string within the plurality of strings;
a ratio of the count of the first string to the count of the plurality of credit tradelines;
a count of a second credit string within the plurality of credit strings; and
a ratio of the count of the second string to the count of the plurality of credit tradelines.

15. The system of claim 11, wherein the feature vector engine is configured to:
identify a plurality of unique strings within the plurality of verification attributes;
determine a plurality of counts for the plurality of unique strings; and
assign a rank to each of the plurality of unique strings based on the plurality of counts,
wherein the augmented feature vector comprises the rank of each of the plurality of unique strings instead of the plurality of unique strings.

16. A non-transitory computer readable medium (CRM) storing instructions that when executed by a computer processor, cause the computer processor to:
train a supervised machine learning (ML) classifier using training feature vectors corresponding to historic access requests and labels for binary outcomes for the historic access requests;
generate, after training the supervised ML classifier, training fraud scores for the training feature vectors;
generate clusters of training augmented feature vectors from the training feature vectors using the training fraud scores;
initialize a plurality of unsupervised ML anomaly detectors using the clusters of training augmented feature vectors;
obtain an access request associated with a user for a software application;
obtain a plurality of verification attributes associated with the user;
classify, by a supervised machine learning (ML) classifier, the access request a feature vector for the user that is based on the plurality of verification attributes to generate a fraud score;
select a first unsupervised ML anomaly detector from a plurality of unsupervised ML anomaly detectors according to the fraud score falling within a unique range assigned to the first unsupervised ML anomaly detector;
execute the first unsupervised ML anomaly detector using an augmented feature vector for the user that is based on the plurality of verification attributes and the fraud score to generate an anomaly score for the access request; and
process the access request based on the anomaly score.

17. The non-transitory CRM of claim 16, wherein:
the access request is initiated from within an accounting software application utilized by the user;

the supervised ML classifier is implemented using gradient boosted decision trees; and each of the unsupervised ML anomaly detectors is implemented using an isolation forest.

18. The non-transitory CRM of claim 16, wherein:

the plurality of verification attributes comprises a user-specified location, an internet protocol (IP) address location associated with a device of the user, and an area code associated with a phone of the user; and the augmented feature vector comprises:
- a first distance between the user-specified location and the IP address location; and
- a second distance between the user-specified location and a region associated with the area code.

19. The non-transitory CRM of claim 16, wherein:

the plurality of verification attributes comprises a plurality numerical values and a plurality of strings associated with a plurality of credit tradelines of the user;

each of the plurality of numerical values corresponds to a first field shared by the plurality of credit tradelines;

each of the plurality of strings corresponds to a second field shared by the plurality of credit tradelines; and the augmented feature vector comprises:
- a count of the plurality of credit tradelines;
- a sum of the plurality of numerical values;
- a standard deviation of the plurality of numerical values;
- a count of a first string within the plurality of strings;
- a ratio of the count of the first string to the count of the plurality of credit tradelines;
- a count of a second credit string within the plurality of credit strings; and
- a ratio of the count of the second string to the count of the plurality of credit tradelines.

20. The non-transitory CRM of claim 16, wherein the instructions further cause the computer processor to:

identify a plurality of unique strings within the plurality of verification attributes;

determine a plurality of counts for the plurality of unique strings; and assign a rank to each of the plurality of unique strings based on the plurality of counts, wherein the augmented feature vector comprises the rank of each of the plurality of unique strings instead of the plurality of unique strings.

\* \* \* \* \*